(12) United States Patent
Jin et al.

(10) Patent No.: US 12,737,848 B2
(45) Date of Patent: Sep. 15, 2026

(54) VIDEO IMAGE PROCESSING METHOD, APPARATUS, AND DEVICE, AND STORAGE MEDIUM

(71) Applicants: Zhejiang Geely Holding Group Co., Ltd, Hangzhou (CN); GEELY AUTOMOBILE RESEARCH INSTITUTE (NINGBO) CO., LTD, Ningbo (CN)

(72) Inventors: Chen Jin, Ningbo (CN); Hongxi Lu, Ningbo (CN); Nen Li, Ningbo (CN); Guoqing Li, Ningbo (CN); Xiangyang Li, Ningbo (CN)

(73) Assignees: ZHEJIANG GEELY HOLDING GROUP CO., LTD., Hangzhou (CN); GEELY AUTOMOBILE RESEARCH INSTITUTE (NINGBO) CO., LTD., Ningbo (CN)

( * ) Notice: Subject to any disclaimer, the term of this patent is extended or adjusted under 35 U.S.C. 154(b) by 287 days.

(21) Appl. No.: 18/476,301

(22) Filed: Sep. 27, 2023

(65) Prior Publication Data

US 2024/0020811 A1 Jan. 18, 2024

Related U.S. Application Data

(63) Continuation of application No. PCT/CN2021/084497, filed on Mar. 31, 2021.

(51) Int. Cl.
*G06T 5/50* (2006.01)
*G06T 5/70* (2024.01)
(Continued)

(52) U.S. Cl.
CPC .................. *G06T 5/50* (2013.01); *G06T 5/70* (2024.01); *G06T 7/12* (2017.01); *G06T 7/60* (2013.01);
(Continued)

(58) Field of Classification Search
CPC .... G06T 5/50; G06T 5/70; G06T 7/12; G06T 7/60; G06T 7/70; G06T 2207/20221;
(Continued)

(56) References Cited

U.S. PATENT DOCUMENTS

2018/0365836 A1 12/2018 Liao
2020/0394813 A1 * 12/2020 Theverapperuma ......................... G05D 1/0257
(Continued)

FOREIGN PATENT DOCUMENTS

CN 106162177 A 11/2016
CN 107071333 A 8/2017
(Continued)

OTHER PUBLICATIONS

Machine translation for CN 108156459, IDS (Year: 2018).*
(Continued)

*Primary Examiner* — Qian Yang

(57) ABSTRACT

Provided is a video image processing method, apparatus, and device, and a storage medium. The method includes: obtaining a first target-frame video image, the first target-frame video image being one of to-be-processed multi-frame video images; performing target detection on the first target-frame video image to determine at least one target object in the first target-frame video image; determining at least one first to-be-processed target object of the at least one target object based on a predetermined classification rule of a to-be-processed target object; and replacing, in the first target-frame video image, the at least one first to-be-processed target object with a predetermined target substitute to obtain a second target-frame video image. Data volume of the predetermined target substitute is smaller than date volume of the at least one first to-be-processed target object.
(Continued)

Obtaining a first target-frame video image, the first target-frame video image being one of to-be-processed multi-frame video images — S101

Performing target detection on the first target-frame video image to determine at least one target object in the first target-frame video image — S103

Determining at least one first to-be-processed target object from the at least one target object based on a predetermined classification rule for a to-be-processed target object — S105

Replacing, in the first target-frame video image, the at least one first to-be-processed target object with a predetermined target substitute to obtain a second target-frame video image — S107

Data volume of a video is reduced without affecting an actual output effect using the method.

12 Claims, 6 Drawing Sheets

(51) Int. Cl.
*G06T 7/12* (2017.01)
*G06T 7/60* (2017.01)
*G06T 7/70* (2017.01)
*G06V 10/764* (2022.01)

(52) U.S. Cl.
CPC .............. *G06T 7/70* (2017.01); *G06V 10/764* (2022.01); *G06T 2207/20221* (2013.01)

(58) Field of Classification Search
CPC .. G06V 10/764; G06V 10/26; G06V 2201/07; H04N 21/23418; H04N 19/20; H04N 19/119; H04N 19/167; H04N 19/172; H04N 19/86
See application file for complete search history.

(56) References Cited

U.S. PATENT DOCUMENTS

| | | | |
|---|---|---|---|
| 2021/0118112 A1 | 4/2021 | Huang et al. | |
| 2021/0150682 A1* | 5/2021 | Sytnik | G06T 19/006 |

FOREIGN PATENT DOCUMENTS

| | | | |
|---|---|---|---|
| CN | 108156459 A | | 6/2018 |
| CN | 112419328 A | | 2/2021 |
| CN | 112541870 A | | 3/2021 |
| DE | 102015205131 | * | 9/2016 |
| JP | 2018152785 A | | 9/2018 |
| JP | 2019191853 A | | 10/2019 |
| JP | 2022501688 A | | 1/2022 |

OTHER PUBLICATIONS

Machine translation for DE 102015205131 (Year: 2016).*
International Search Report dated Dec. 30, 2021 in International Application No. PCT/CN2021/084497. English translation attached.
Extended European Search Report from corresponding European Application No. EP21933777.1, dated Oct. 30, 2024.
Xiuxiu Bai et al. "Self-Adaptive Superpixels Based on Neural Network Models" IEEE Access, IEEE, USA, vol. 8, Jul. 23, 2020 (Jul. 23, 2020), pp. 137254-137262, XP011802732.
Grant Notice dated Nov. 26, 2024 received in Japanese Patent Application No. JP2023-560483. English translation attached.
First Office Action dated Jul. 30, 2024 received in corresponding patent family application No. JP2023-560483. English translation attached.
Jonghyun Ahn et al., An Optical Image Transmission System for Deep Sea Creature Sampling Missions Using Autonomous Underwater Vehicle, IEEE Journal of Oceanicengineering, Oct. 31, 2018, vol. 45, No. 2, pp. 350-361.
First Office Action dated Dec. 11, 2025 received in corresponding patent family application No. CN202180083386.5. English translation attached.
First Office Action dated Jan. 9, 2026 received in corresponding patent family application No. KR1020237036019. English translation attached.
Second Office Acction dated May 29, 2026 received in corresponding Chinese patent family application No. CN202180083386.5. English translation attached.

* cited by examiner

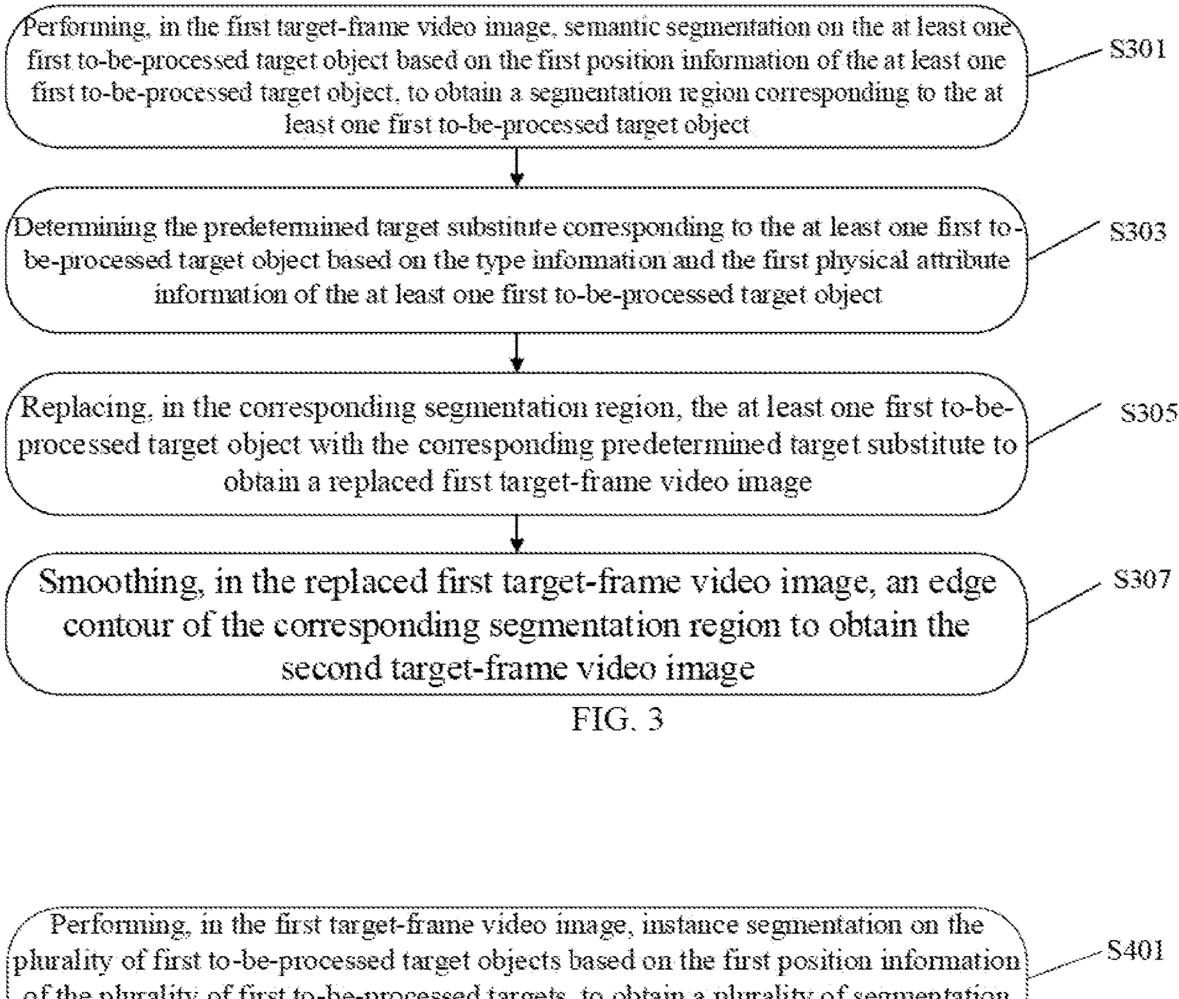

FIG. 3

Performing, in the first target-frame video image, instance segmentation on the plurality of first to-be-processed target objects based on the first position information of the plurality of first to-be-processed targets, to obtain a plurality of segmentation regions corresponding to the plurality of first to-be-processed target objects

S401

Determining, based on the type information and the first physical attribute information of the plurality of first to-be-processed target objects, a plurality of predetermined target substitutes corresponding to the plurality of first to-be-processed targets, respectively

S403

Replacing, in the corresponding plurality of segmentation regions, the plurality of first to-be-processed target objects with the corresponding plurality of predetermined target substitutes respectively, to obtain a replaced first target-frame video image

S405

Smoothing, in the replaced first target-frame video image, edge contours of the corresponding plurality of segmentation regions, to obtain the second target-frame video image

VIDEO IMAGE PROCESSING METHOD, APPARATUS, AND DEVICE, AND STORAGE MEDIUM

CROSS-REFERENCE TO RELATED APPLICATIONS

This application is a continuation of International Application No. PCT/CN2021/084497, filed on Mar. 31, 2021, the entire disclosure of which is incorporated herein by reference.

FIELD

The present disclosure relates to the field of image processing technologies, and more particularly, to a video image processing method, apparatus, and device, and a storage medium.

BACKGROUND

Currently, security, medical, automotive, and other industries are all transmitting and processing relevant information based on visual perception or visual monitoring. For example, the automotive industry can use vehicle-side cameras for environment perception, data fusion, remote driving, etc., and road-side cameras for road pavement monitoring, traffic flow control, etc. However, due to technical limitations of current network communication, when multi-channel video data are transmitted remotely or in real time, there are problems such as channel overload, high time delay of a transmission rate, and long video coding and decoding time period. When a subject receiving information has no high requirement for actual video data, a current mainstream solution is to convert all relevant target objects into animations or color blocks before the transmission to reduce an influence of unnecessary information on the transmission rate.

However, when an original target object in the video picture is completely converted into a target substitute such as an animation or a color block, the transmission of the effective information is reduced due to a difference between the original target object and the target substitute in terms of an identification effect. Therefore, a driving risk is increased due to possible misidentification or missed identification of important information by the subject receiving the information. Thus, a more effective technical solution needs to be provided.

SUMMARY

In order to solve the problems of the related art, the present disclosure provides a video image processing method, apparatus, and device, and a storage medium. The technical solution is as follows.

In one aspect, provided is a video image processing method. The method includes: obtaining a first target-frame video image, the first target-frame video image being one of to-be-processed multi-frame video images; performing target detection on the first target-frame video image to determine at least one target object in the first target-frame video image; determining at least one first to-be-processed target object from the at least one target object based on a predetermined classification rule for a to-be-processed target object; and replacing, in the first target-frame video image, the at least one first to-be-processed target object with a predetermined target substitute to obtain a second target-frame video image. Data volume of the predetermined target substitute is smaller than date volume of the at least one first to-be-processed target object.

In another aspect, provided is a video image processing. The apparatus includes: a video image obtaining module configured to obtain a first target-frame video image, the first target-frame video image being a frame video image of to-be-processed multi-frame video images; a target detection module configured to perform target detection on the first target-frame video image to determine at least one target object in the first target-frame video image; a target classification module configured to determine at least one first to-be-processed target object from the at least one target object based on a predetermined classification rule for a to-be-processed target object; and a target replacement module configured to replace, in the first target-frame video image, the at least one first to-be-processed target object with a predetermined target substitute to obtain a second target-frame video image. Data volume of the predetermined target substitute is smaller than data volume of the at least one first to-be-processed target object.

In yet another aspect, provide is a video image processing device. The device includes: a processor; and a memory having least one instruction or program stored thereon. The at least one instruction or program is loaded and executed by the processor to implement the above-mentioned video image processing method.

In still yet another aspect, provided is a computer-readable storage medium. The device has at least one instruction or program stored therein. The at least one instruction or program is loaded and executed by a processor to implement the above-mentioned video image processing method.

BRIEF DESCRIPTION OF THE DRAWINGS

In order to clearly explain technical solutions and advantages of embodiments of the present disclosure or in the related art, drawings used in description of the embodiments or the related art will be briefly described below. The drawings described below merely illustrate some embodiments of the present disclosure. Based on these drawings, other drawings can be obtained by those skilled in the art without creative effort.

FIG. 3 is a flowchart of replacing a to-be-processed target object with a predetermined target substitute according to an embodiment of the present disclosure.

FIG. 4 is another flowchart of replacing a to-be-processed target object with a predetermined target substitute according to an embodiment of the present disclosure.

DETAILED DESCRIPTION

Reference will be made clearly and completely technical solutions in the embodiments of the present disclosure with accompanying drawings. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure.

It should be noted that terms such as "first" and "second" in the description of the embodiments of the present disclosure, the appended claims, and the accompanying drawings are used to distinguish similar objects, rather than to describe a specific sequence or order. It should be understood that data used in this way can be interchanged with each other under appropriate circumstances, such that the described embodiments of the present disclosure can be implemented in a sequence other than those illustrated in the figures or described in the present disclosure. In addition, the terms "including" and "having" and any variants thereof as used in the description of the embodiments of the present disclosure, the appended claims, and the above accompanying drawings are intended to cover non-exclusive inclusions. For example, a process, method, system, product, or device that includes a series of steps or units is not necessarily limited to those explicitly listed steps or units, but may also include other steps or units that are not explicitly listed or are inherent to the process, method, product, or device.

Figures 1, 2:
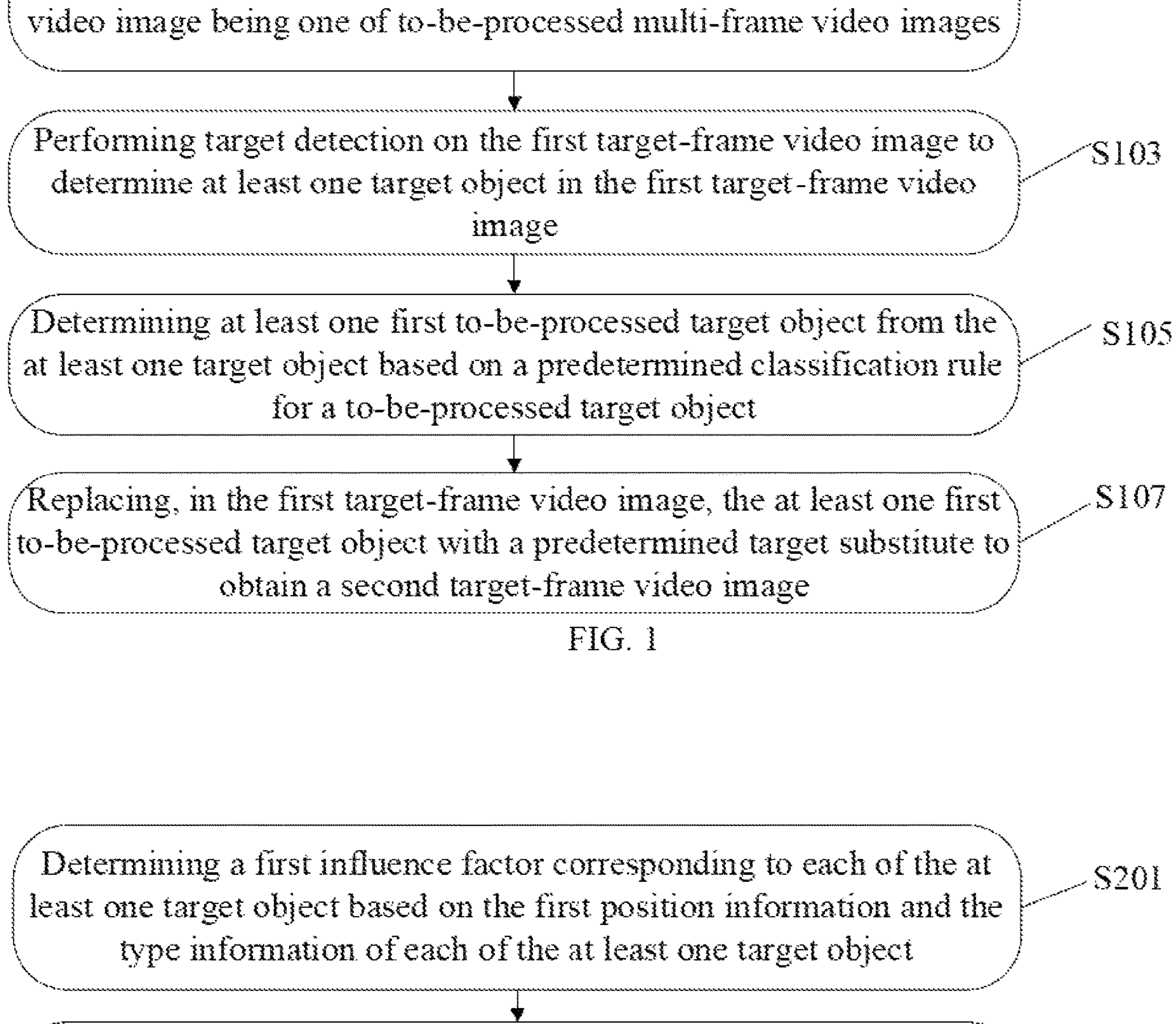
FIG. 1 is a flowchart of a video image processing method according to an embodiment of the present disclosure.
FIG. 2 is a flowchart of a to-be-processed target object determination method according to an embodiment of the present disclosure.

A vehicle warning method according to the embodiments of the present disclosure is described below. FIG. 1 is a flowchart of a vehicle warning method according to an embodiment of the present disclosure. It should be noted that the present specification provides operation steps of the method as described in the embodiments or flowcharts, but may include more or fewer operation steps based on conventional or uncreative labor. Sequence of steps enumerated in the embodiments is only one way of executing the sequence of many steps and does not represent the only sequence of execution. In practice, when the system or product is executed, it can be executed sequentially or in parallel (e.g., parallel processor or multi-threaded processing environment) according to the embodiments or the method illustrated in the accompanying drawings. Specifically, as illustrated in FIG. 1, the above-mentioned method may include operations at blocks S101 to S107.

At block S101, a first target-frame video image is obtained. The first target-frame video image is one of to-be-processed multi-frame video images.

In the embodiments of the present specification, the to-be-processed multi-frame video images may be multi-frame video images in video data, and the video data may include vehicle-side real-time video data obtained by a vehicle-mounted camera for visual perception or visual monitoring. The first target-frame video image may be one-frame real-time video image of multi-frame vehicle-side real-time video images in a current vehicle.

At block S103, target detection is performed on the first target-frame video image to determine at least one target object in the first target-frame video image.

In the embodiments of the present specification, the operation of performing the target detection on the first target-frame video image to determine the at least one target object in the first target-frame video image includes: inputting the first target-frame video image into a target detection model for target detection, to obtain a first target detection result. The first target detection result includes the at least one target object in the first target-frame video image.

In a specific embodiment, the target detection model may be obtained after a predetermined machine learning model is detected and trained based on a sample video image labeled with the target object. In an embodiment, a training method of the target detection model may include the following operations.

(1) A sample vehicle-side video image labeled with a target object label is obtained.

In a practical application, training data may be determined before neural network machine learning is conducted. In the embodiments of the present specification, the sample video image labeled with the target object label may be obtained as the training data.

In an embodiment, the sample vehicle-side video image may include a vehicle-side video image containing a corresponding target object. The target object label may be used as identification of the corresponding target object. The target object may be a target object related to actual perception demand or monitoring demand of the vehicle-side video image. In an embodiment, the target object may include, but is not limited to, a roadside building, roadside equipment, a pedestrian, and a vehicle.

(2) Based on the sample video image, the predetermined machine learning model is used for target detection training, model parameters of the predetermined machine learning model are adjusted in the target detection training until the target detection result outputted by the predetermined machine learning model is matched with the target object labels.

In an embodiment, the predetermined machine learning model may include, but is not limited to, a neural network machine learning model. The model parameters may include a model parameter (weight) learned during training. The target detection result includes a target object in the sample video image.

(3) A machine learning model corresponding to current model parameters is used as the target detection model.

As can be seen from the above-mentioned embodiments of the present specification, the sample vehicle-side video image labeled with the target object label is used as the training data, and the trained target detection model can detect a target object label of a same type of vehicle-side video image as the training data through the machine learning.

In the embodiments of the present specification, the first target detection result may further include type information, first position information, and first physical attribute information of each of the at least one target object.

In an embodiment, during the training of the target detection model, the target object label may also include type information, position information, and physical attribute information of the target object. The target detection model is trained with the sample vehicle-side video image labeled with the target object label, and therefore the target detection result of the target detection model may also include the type information, the position information, and the physical attribute information of the target object.

In an embodiment, the type information characterizes basic classification categories of the target object and may include but is not limited to a building, a street light, a traffic light, a tree, a pedestrian, and a vehicle. The position information characterizes position information of the target object in the video image relative to the current vehicle and the first position information may include position information of the target object in the first target-frame video image. The physical attribute information characterizes physical attributes of the target object in the video image and may include but is not limited to contour feature information. The first physical attribute information may include physical attribute information of the target object in the first target-frame video image.

S105, at least one first to-be-processed target object from the at least one target object is determined based on a predetermined classification rule for a to-be-processed target object.

In the embodiments of the present specification, the at least one first to-be-processed target object may be a target object that is in the first target-frame video image and irrelevant or weakly correlated with a driving path of the current vehicle.

In a specific embodiment, as illustrated in FIG. 2, FIG. 2 is a flowchart of a to-be-processed target object determination method according to an embodiment of the present disclosure, which may specifically include operations at blocks S201 and S203.

At block S201, a first influence factor corresponding to each of the at least one target object is determined based on the first position information and the type information of each of the at least one target object.

In an embodiment, an influence factor may characterize the degree to which position information and type information of a target object in a current video image affect the driving path of the current vehicle. Generally, the degree of influence increases with the influence factor. In the embodiments of the present specification, an influence factor algorithm may be derived and summarized based on position information and type information of a large number of sample target objects and corresponding predetermined influence factors. Position information and type information of a target object are analyzed based on the influence factor algorithm to obtain an influence factor of the target object.

In the embodiments of the present specification, the first influence factor may be an influence factor in the first target-frame video image.

S203, a target object from the at least one target object corresponding to a first influence factor that satisfies a first predetermined condition is determined as the at least one first to-be-processed target object.

In the embodiments of the present specification, the influence factor may include but is not limited to being irrelevant, weakly correlated, and strongly correlated. An influence factor being irrelevant or weakly correlated is set as the first predetermined condition based on the actual monitoring demand and safety warning demand of the vehicle. In the embodiments of the present specification, the at least one first to-be-processed target object may be a target object having the first influence factor being irrelevant or weakly correlated.

In the practical application, the at least one first to-be-processed target object may be a fixed target that is irrelevant to a vehicle planning path or an actual driving path, as well as a static or dynamic target object with less correlation.

In an embodiment, the at least one first to-be-processed target object may include but not is limited to a building, a street light, a traffic light, a road edge, a pedestrian on the road edge, a vehicle parked on a roadside.

S107, in the first target-frame video image, the at least one first to-be-processed target object is replaced with a predetermined target substitute to obtain a second target-frame video image. Data volume of the predetermined target substitute is smaller than date volume of the at least one first to-be-processed target object.

In an embodiment, the predetermined target substitute may be a predetermined target substitute matched with type information and physical attribute information of the at least one first to-be-processed target object, and the data volume of the predetermined target substitute is smaller than the data date volume of the at least one first to-be-processed target object.

In an embodiment, as illustrated in FIG. 3, the operation of replacing, in the first target-frame video image, the at least one first to-be-processed target object with the predetermined target substitute to obtain the second target-frame video image includes operations at blocks S301 to S307.

At block S301, in the first target-frame video image, semantic segmentation is performed on the at least one first to-be-processed target object based on the first position information of the at least one first to-be-processed target object, to obtain a segmentation region corresponding to the at least one first to-be-processed target object.

In the practical application, the semantic segmentation is to categorize each pixel in the video image into a corresponding category, i.e., to achieve classification at a pixel level.

In an embodiment, the semantic segmentation of the at least one first to-be-processed target object is performed in the first target frame video image based on the first position information of the at least one first to-be-processed target object, to determine a region where an original pixel image of the at least one first to-be-processed target object is located. The region where the original pixel image of the at least one first to-be-processed target object is located is taken as the segmentation region corresponding to the at least one first to-be-processed target object.

At block S303, the predetermined target substitute corresponding to the at least one first to-be-processed target object is determined based on the type information and the first physical attribute information of the at least one first to-be-processed target object.

In an embodiment, a predetermined target substitute matched with the type information and the first physical attribute information of the at least one first to-be-processed target object is determined, i.e., the type information and the first physical attribute information of the at least one first to-be-processed target object may be identified by the predetermined target substitute. The predetermined target substitute may include, but is not limited to, an animated cartoon or a color block having smaller data volume.

At block S305, in the corresponding segmentation region, the at least one first to-be-processed target object is replaced with the corresponding predetermined target substitute to obtain a replaced first target-frame video image.

In an embodiment, in a segmentation region corresponding to the first target-frame video image, the at least one first to-be-processed target object is replaced with a predetermined animated cartoon or a predetermined color block to obtain the replaced first target-frame video image. Data volume of the replaced first target-frame video image is smaller than data amount of the first target frame video image.

At block S307, in the replaced first target-frame video image, an edge contour of the corresponding segmentation region is smoothed to obtain the second target-frame video image.

In the practical application, due to sharpness of the edge contour of the segmentation region and a possible lack of complete overlap between a contour of the predetermined target substitute and the edge contour of the segmentation region, it is necessary to fuzzily smooth the edge contour to allow for a more natural transition of an edge.

As can be seen from the above-mentioned embodiments of the present specification, in a case where the position information and the physical attribute information of the at least one of the first to-be-processed target object are retained in the embodiment, the at least one of the first to-be-processed target object is replaced with the predetermined target substitute having the smaller data volume. In this way, data volume of a video screen is reduced and an actual output effect is not affected.

In another embodiment, as illustrated in FIG. 4, when the at least one first to-be-processed target object includes a plurality of first to-be-processed target objects, the operation of replacing, in the first target-frame video image, the at least one first to-be-processed target object with the corresponding predetermined target substitute to obtain the second target-frame video image includes operations at blocks S401 to S407.

At block S401, in the first target-frame video image, instance segmentation is performed on the plurality of first to-be-processed target objects based on the first position information of the plurality of first to-be-processed target objects, to obtain a plurality of segmentation regions corresponding to the plurality of first to-be-processed target objects.

In the practical application, the instance segmentation performs classification at the pixel level and distinguishes different instances on a basis of specific classes, and the instances are specific objects of the classes.

In an embodiment, in the first target-frame video image, instance segmentation is performed on the plurality of first to-be-processed target objects based on the first position information of the plurality of first to-be-processed target objects, to determine regions where original pixel images of the plurality of first to-be-processed target objects are located. The regions where the original pixel images of the plurality of first to-be-processed target objects are located are used as the segmentation regions corresponding to the plurality of first to-be-processed target objects.

At block S403, based on the type information and the first physical attribute information of the plurality of first to-be-processed target objects, a plurality of predetermined target substitutes corresponding to the plurality of first to-be-processed target objects are determined, respectively.

In an embodiment, the plurality of predetermined target substitutes matched with the type information and the first physical attribute information of the plurality of first to-be-processed target objects are determined, respectively, i.e., the type information and the first physical attribute information of the plurality of corresponding first to-be-processed target objects may be identified by the plurality of predetermined target substitutes, respectively. Each of the plurality of predetermined target substitutes may include, but is not limited to, an animated cartoon or a color block having smaller data volume.

In the embodiments of the present disclosure, when the plurality of first to-be-processed target objects include a plurality of first to-be-processed target objects of a same type, the plurality of predetermined target substitutes corresponding to the plurality of first to-be-processed target objects of the same type are set to a plurality of animated cartoons or color blocks containing same type information but different style information.

In the practical application, the style information may include, but is not limited to, color information and shadow information.

At block S405, in the corresponding plurality of segmentation regions, the plurality of first to-be-processed target objects is replaced with the corresponding plurality of predetermined target substitutes respectively, to obtain a replaced first target-frame video image.

In an embodiment, in the segmentation region corresponding to the first target-frame video image, the plurality of first to-be-processed target object are replaced with the plurality of corresponding animated cartoons or color blocks to obtain the replaced first target-frame video image. Data volume of the replaced first target-frame video image is smaller than data volume of the first target-frame video image.

At block S407, in the replaced first target-frame video image, edge contours of the corresponding plurality of segmentation regions are smoothed, to obtain the second target-frame video image.

In an embodiment, the smoothing of the edge contours of the plurality of segmented regions may be found in the relevant description of the operation at block S407, and details are not repeated herein.

As can be seen from the embodiments of the present specification, the plurality of first to-be-processed target objects are replaced with the plurality of corresponding predetermined target substitutes having smaller data volume in the embodiment. In the case where the position information and the physical attribute information of the plurality of first to-be-processed target objects are retained, a plurality of first to-be-processed target objects are distinguished from a plurality of first to-be-processed target objects belonging to the same type. In this way, data volume of the video picture is reduced, and transmission delay of the video picture is decreased.

Figure 5:
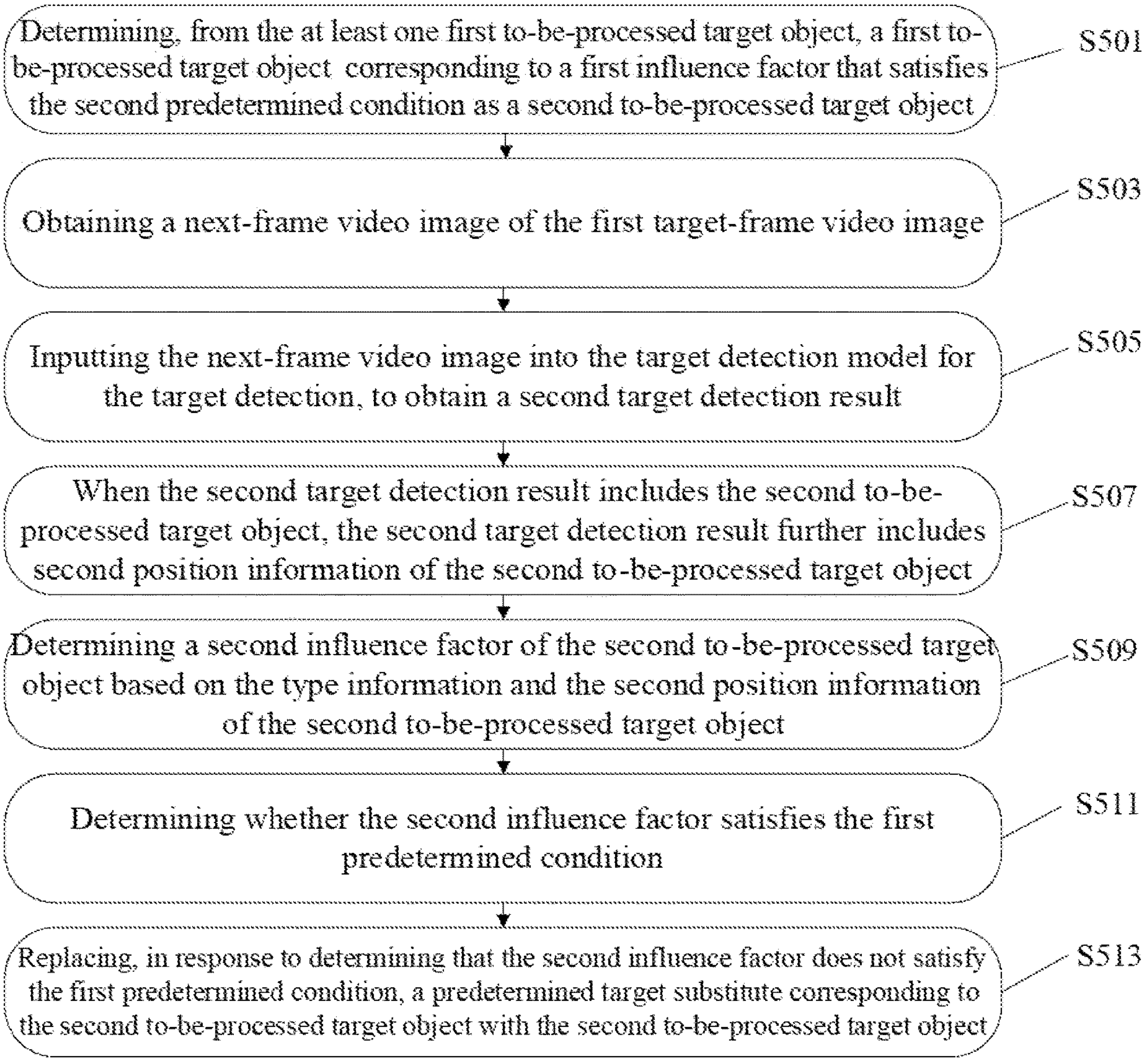
FIG. 5 is a flowchart of tracking a second to-be-processed target object according to an embodiment of the present disclosure.

In a specific embodiment, as illustrated in FIG. 5, when the first predetermined condition includes a second predetermined condition, the method further includes, subsequent to the operation of determining, from the at least one target object, the target object corresponding to the first influence factor that satisfies the first predetermined condition as the at least one first to-be-processed target object, an operation at block S501.

At block S501, a first to-be-processed target object from the at least one first to-be-processed target object corresponding to a first influence factor that satisfies the second predetermined condition is determined as a second to-be-processed target object.

In the embodiments of the present specification, the influence factor being weakly correlated is set as the second predetermined condition based on the actual monitoring demand and the safety warning demand of the vehicle. The second to-be-processed target object may be a target with the first influence factor being weakly correlated.

In the practical application, the second to-be-processed target object may be a static or dynamic target object with less correlation with a planning path or an actual driving path of the vehicle. In an embodiment, the second to-beprocessed target object may include, but is not limited to, a pedestrian on a roadside, a vehicle parked on the roadside.

Accordingly, the method further includes, subsequent to the operation of replacing, in the first target-frame video image, the at least one first to-be-processed target object with the predetermined target substitute to obtain the second target-frame video image, operations at blocks S503 to S513.

At block S503, a next-frame video image of the first target-frame video image is obtained.

In the practical application, the next-frame video image of the first target-frame video image is obtained based on an order in timeline of the to-be-processed multi-frame video images.

At block S505, the next-frame video image is inputted into the target detection model for the target detection, to obtain a second target detection result.

In an embodiment, the target detection of the next-frame video image herein is similar to the operation of the target detection of the first target-frame video image at block S103. The specific operation may be found in the description related to the operation of the target detection of the first target-frame video image at block S103, and details thereof are not repeated here.

At block S507, when the second target detection result includes the second to-be-processed target object, the second target detection result further includes second position information of the second to-be-processed target object.

In an embodiment, the second position information characterizes position information of the second to-be-processed target object in the next-frame video image.

S509, a second influence factor of the second to-be-processed target object is determined based on the type information and the second position information of the second to-be-processed target object.

In an embodiment, the second influence factor characterizes an influence factor of the second to-be-processed target object in the next video image on the driving path of the current vehicle. In an embodiment, the operation of determining the second influence factor of the second to-be-processed target object is similar to the operation of determining the first influence factor of the target object at block S201. The specific operation may be found in the description related to the operation of determining the first influence factor of the target object at block S201, and details thereof are not repeated herein.

At block S511, whether the second influence factor satisfies the first predetermined condition is determined.

In an embodiment, target tracking is performed on the second to-be-processed target object in the first target-frame video image, and whether the second to-be-processed target object may further be determined as a to-be-processed target object is determined in the next-frame video image.

At block S513, in response to determining that the second influence factor does not satisfy the first predetermined condition, a predetermined target substitute corresponding to the second to-be-processed target object is replaced with the second to-be-processed target object.

In the practical application, as an action path of the second to-be-processed target object changes, an influence factor of the second to-be-processed target object changes. When the second influence factor of the second to-be-processed target object does not satisfy the first predetermined condition, a current second to-be-processed target object has a greater influence on a driving path of a current vehicle. Therefore, instead of replacing the current second to-be-processed target object with a corresponding predetermined target substitute, a real-time original image of the current second to-be-processed target object is directly transmitted to ensure that important information in the video image can be accurately and timely transmitted.

Figure 6:
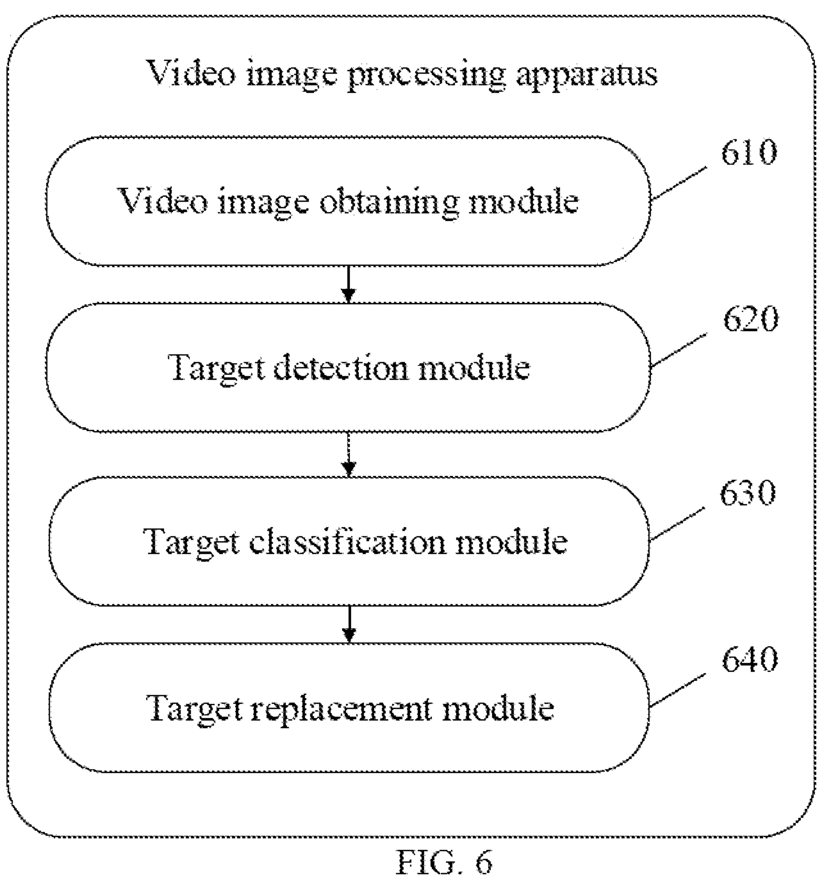
FIG. 6 is a schematic diagram of a video image processing apparatus according to an embodiment of the present disclosure.

The embodiments of the present disclosure provide a video image processing device. As illustrated in FIG. 6, the device includes: a video image obtaining module 610 configured to obtain a first target-frame video image, the first target-frame video image being a frame video image of to-be-processed multi-frame video images; a target detection module 620 configured to perform target detection on the first target-frame video image to determine at least one target object in the first target-frame video image; a target classification module 630 configured to determine at least one first to-be-processed target object from the at least one target object based on a predetermined classification rule for a to-be-processed target object; and a target replacement module 640 configured to replace, in the first target-frame video image, the at least one first to-be-processed target object with a predetermined target substitute to obtain a second target-frame video image. Data volume of the predetermined target substitute is smaller than data volume of the at least one first to-be-processed target object.

In the embodiments of the present specification, the target detection module 620 may include a first target detection result unit configured to input the first target-frame video image into a target detection model for target detection, to obtain a first target detection result. The first target detection result includes the at least one target object in the first target-frame video image.

In the embodiments of the present specification, the first target detection result further includes type information and first position information of each of the at least one target object.

Figure 7:
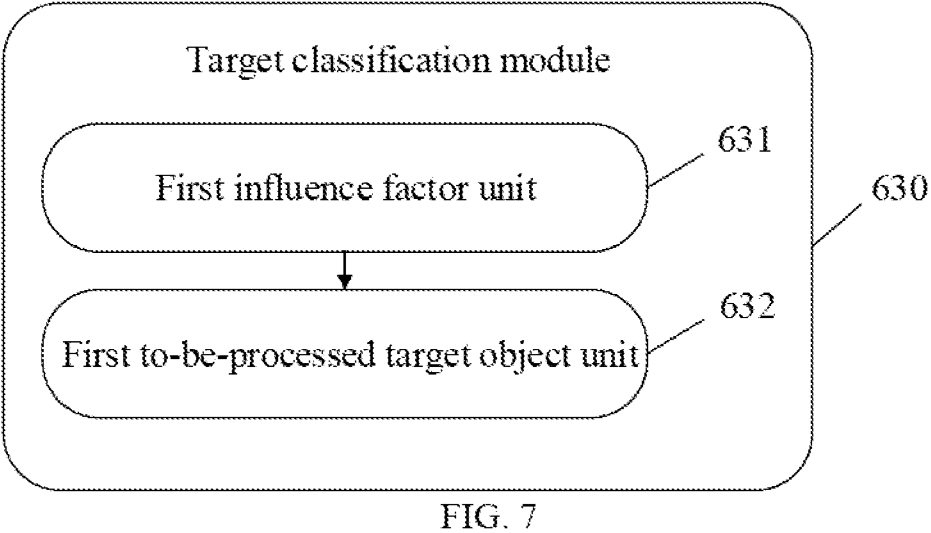
FIG. 7 is a schematic diagram of a target classification module according to an embodiment of the present disclosure.

In a specific embodiment, as illustrated in FIG. 7, the target classification module 630 may include: a first influence factor unit 631 configured to determine a first influence factor corresponding to each of the at least one target object based on the first position information and the type information of each of the at least one target object; and a first to-be-processed target object unit 632 configured to determine, from the at least one target object, a target object corresponding to a first influence factor that satisfies a first predetermined condition as the at least one first to-be-processed target object.

Figure 8:
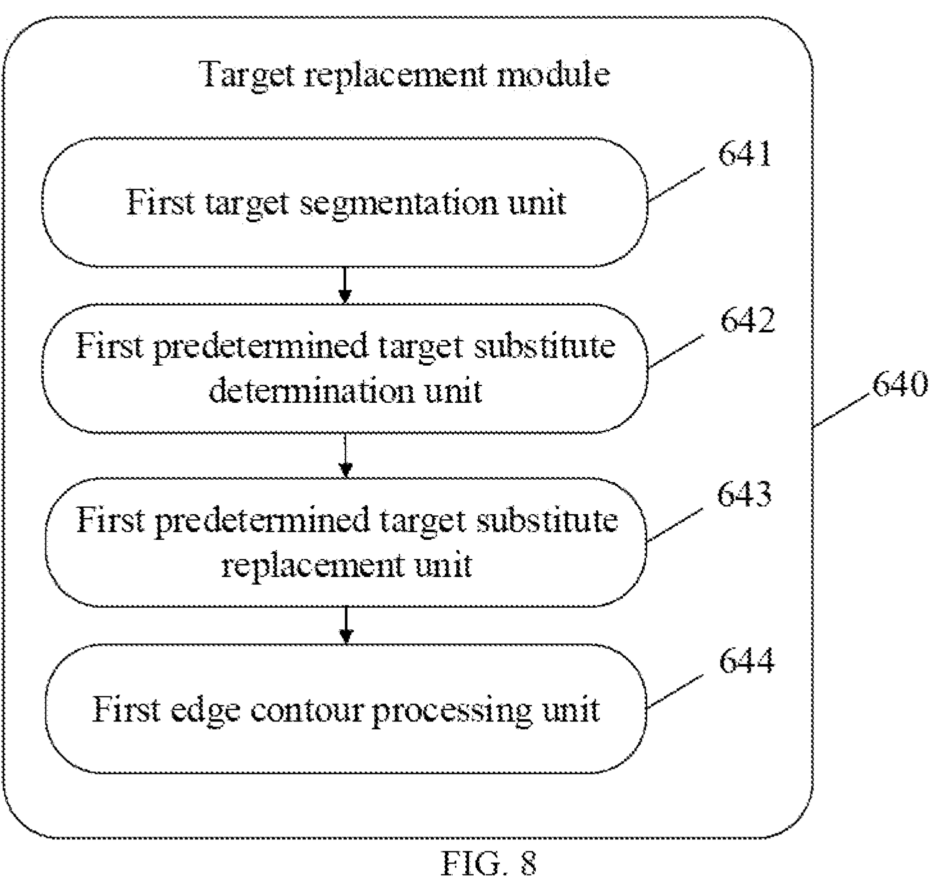
FIG. 8 is a schematic diagram of a target replacement module according to an embodiment of the present disclosure.

In an embodiment, as illustrated in FIG. 8, the first target detection result further includes first physical attribute information of the at least one first to-be-processed target object; and the target replacement module 640 may include: a first target segmentation unit 641 configured to perform, in the first target-frame video image, semantic segmentation on the at least one first to-be-processed target object based on the first position information of the at least one first to-be-processed target object, to obtain a segmentation region corresponding to the at least one first to-be-processed target object; a first predetermined target substitute determination unit 642 configured to determine a predetermined target substitute corresponding to the at least one first to-be-processed target object based on the type information and the first physical attribute information of the at least one first to-be-processed target object; a first predetermined target substitute replacement unit 643 configured to replace, in the corresponding segmentation region, the at least one first to-be-processed target object with the corresponding predetermined target substitute to obtain a replaced first target-frame video image; and a first edge contour processing unit 644 configured to smooth, in the replaced first target-frame video image, an edge contour of the corresponding segmentation region to obtain the second target-frame video image.

Figure 9:
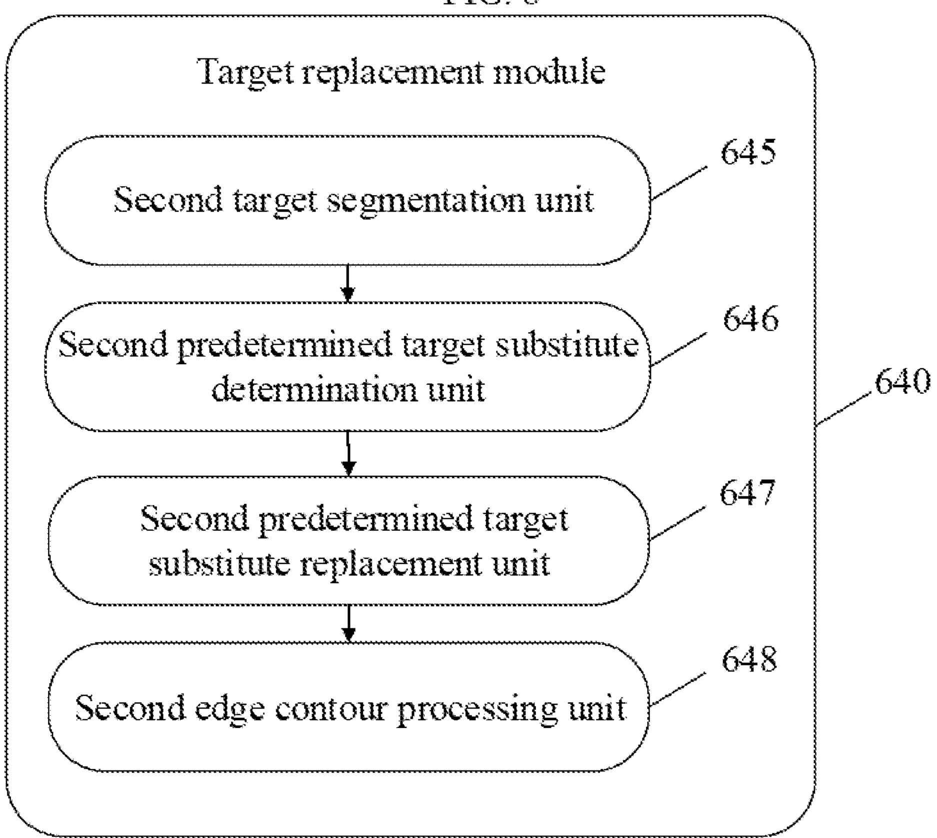
FIG. 9 is a schematic diagram of another target replacement module according to an embodiment of the present disclosure.

In another embodiment, as illustrated in FIG. 9, when the at least one first to-be-processed target object includes a plurality of first to-be-processed target objects, the first target detection result further includes first physical attribute information of the plurality of first to-be-processed target objects; and the target replacement module 640 may further includes: a second target segmentation unit 645 configured to perform, in the first target-frame video image, instance segmentation on the plurality of first to-be-processed target objects based on the first position information of the plurality of first to-be-processed target objects, to obtain a plurality of segmentation regions corresponding to the plurality of first to-be-processed target objects; a second predetermined target substitute determination unit 646 configured to determine, based on the type information and the first physical attribute information of the plurality of first to-be-processed target objects, a plurality of predetermined target substitutes corresponding to the plurality of first to-be-processed target objects, respectively; a second predetermined target substitute replacement unit 647 configured to replace, in the corresponding plurality of segmentation regions, the plurality of first to-be-processed target objects with the corresponding plurality of predetermined target substitutes respectively, to obtain a replaced first target-frame video image; and a second edge contour processing unit 648 configured to smooth, in the replaced first target-frame video image, edge contours of the corresponding plurality of segmentation regions to obtain the second target-frame video image.

In a specific embodiment, when the first predetermined condition includes a second predetermined condition, the apparatus further includes: a second to-be-processed target object unit configured to determine, from the at least one first to-be-processed target object, a first to-be-processed target object corresponding to a first influence factor that satisfies the second predetermined condition as a second to-be-processed target object; a next-frame video image obtaining unit configured to obtain a next-frame video image of the first target-frame video image; a second target detection result unit configured to input the next-frame video image into the target detection model for the target detection, to obtain a second target detection result; a second position information unit configured such that the second target detection result further includes second position information of the second to-be-processed target object when the second target detection result includes the second to-be-processed target object; a second influence factor unit configured to determine a second influence factor of the second to-be-processed target object based on the type information and the second position information of the second to-be-processed target object; a first predetermined condition determination unit configured to determine whether the second influence factor satisfies the first predetermined condition; and a second to-be-processed target object replacement unit configured to replace, in response to determining that the second influence factor does not satisfy the first predetermined condition, a predetermined target substitute corresponding to the second to-be-processed target object with the second to-be-processed target object.

The apparatus in the apparatus embodiments is based on the same inventive concept as the method embodiments.

The embodiments of the present disclosure provide a video image processing device. The video image processing device includes a processor; and a memory having least one instruction or program stored thereon. The at least one instruction or program is loaded and executed by the processor to implement the video image processing method according to the above-mentioned method embodiments.

The memory may be used to store a software program and module, and the processor may run the software program and module that are stored in the memory to perform various functional applications and data processing. The memory may primarily include a storage program region and a storage data region. The storage program region may store an operating system, an application program required for the functions, etc. The storage data region may store the data created based on the use of the device, etc. In addition, the memory may include high-speed random access memory, and may also include non-volatile memory, such as at least one disk memory device, flash memory device, or other volatile solid-state memory devices. Accordingly, the memory may also include a memory controller to provide the processor's access to the memory.

Figure 10:
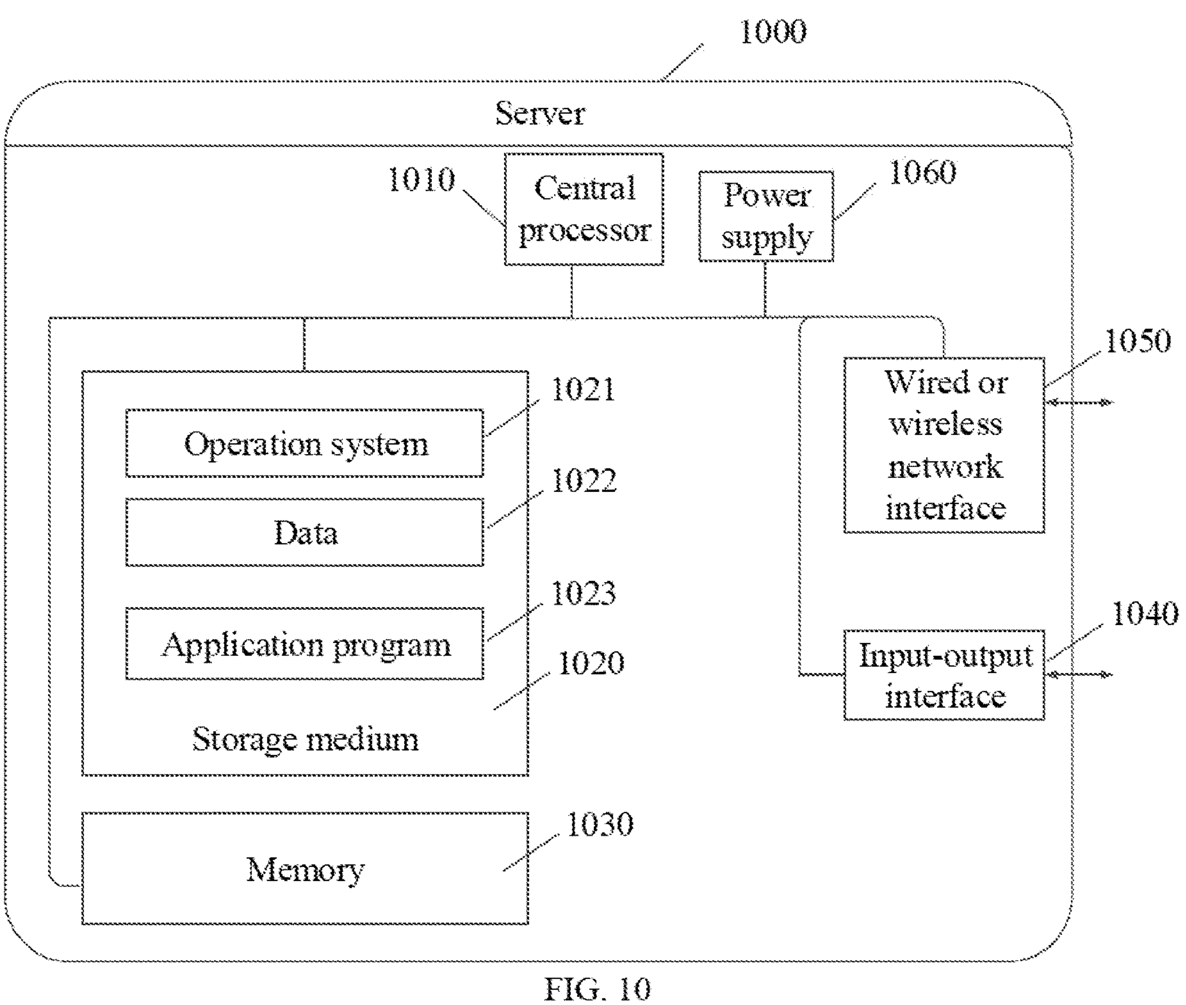
FIG. 10 is a block diagram of a hardware structure of a video image processing server according to an embodiment of the present disclosure.

The method embodiments according to the embodiments of the present disclosure may be performed in a mobile terminal, a computer terminal, a server, or a similar computing device, i.e., the computer apparatus may include a mobile terminal, a computer terminal, a server, or a similar computing device. Running on a server is taken as an example. FIG. 10 is a block diagram of a hardware structure of a video image processing server according to an embodiment of the present disclosure. As illustrated in FIG. 10, a video image processing server 1000 may have wider differences due to configuration or performance and may include one or more Central Processing Units (CPUs) 1010 (the CPU 1010 may include, but is not limited to, a processing apparatus of a Micro Processing Unit (MCU) or a Field Programmable Gate Array (FPGA)), a memory 1030 configured to store data, a storage medium 1020 (e.g., one or more mass storage devices) configured to store one or more application programs 1023 or data 1022. The memory 1030 and the storage medium 1020 may be ephemeral storage or persistent storage. A program stored in the storage medium 1020 may include one or more modules, each of the one or more modules may include a series of operation instructions in the server. Further, the CPU 1010 may be set to be brought into communication with the storage medium 1020 to execute the series of instruction operations in the storage medium 1020 on the video image processing server 1000. The video image processing server 1000 may also include one or more power supplies 1060, one or more wired or wireless network interfaces 1050, one or more input-output interfaces 1040, and/or, one or more operation systems 1021, such as Windows Server™, Mac OS X™, Unix™, Linux™, FreeBSD™, etc.

The input-output interfaces 1040 may be configured to receive or send data over a network. Specific examples of the network may include a wireless network provided by a communication supplier of the video image processing server 1000. In an example, the input-output interface 1040 includes a Network Interface Controller (NIC), which may be connected to other network devices via a base station and thus communicate with the Internet. In an example, the input-output interface 1040 may be a Radio Frequency (RF) module, which is configured to wirelessly communicate with the Internet.

It can be understood by those skilled in the art that, the structure illustrated in FIG. is only schematic and does not limit the structure of the electronic device. For example, the video image processing server 1000 may also include more or fewer components than the components illustrated in FIG. 10, or have a different configuration than the configuration illustrated in FIG. 10.

The embodiments of the present disclosure further provide a storage medium. The storage medium may be disposed in the server to store at least one instruction or program configured to implement and related to the video image processing method in one of the method embodiments. The at least one instruction or the at least one program is loaded and executed by a processor to implement the video image processing method according to the above-mentioned method embodiments.

In the embodiment, the storage medium may be located on at least one network server of a plurality of network servers of a computer network. In the embodiment, the storage medium may include, but is not limited to, various other media that can store a program code, such as a USB flash drive, a Read-Only Memory (ROM), a Random Access Memory (RAM), a removable hard disk, a diskette, or an optical disk.

As can be seen form the video image processing method, apparatus, and device, or a storage medium according to the embodiments of the present disclosure, in the technical solution according to the present disclosure, through the target detection and classification of the video image, the important target objects among all target objects are retained. Meanwhile, other to-be-processed target objects are converted into the substitutes having the smaller data volume. The two kinds of objects are outputted in combination within the shorter time delay. In the one hand, the actual output effect of the video is not affected to guarantee the important information can be transmitted timely. On the other hand, the data volume of the video is reduced. In this way, the transmission rate of the video is improved, and the transmission delay of the video is reduced. Furthermore, weakly relevant target objects in other target objects can be tracked. When the weakly relevant target objects are changed into the strongly relevant target objects, the real-time original image of the weakly relevant target objects are directly outputted to further ensure the accurate transmission of important information in the video image.

It should be noted that the above sequence numbers of the embodiments of the present disclosure are for description only, and do not represent superiority or inferiority of the embodiments. Other embodiments are within the scope of the appended claims. In some cases, the actions or steps described in the claims can be performed in a sequence different from those in the embodiments and still can achieve a desired result. In addition, a particular sequence or a successive sequence is not required to be illustrated in the processes depicted in the accompanying drawings to achieve the desired results. In some implementations, multitasking and parallel processing may also be available or may be advantageous.

Each embodiment in the specification is described in a progressive manner. The same or similar parts of various embodiments can be referred to each other. Each embodiment focuses on differences from other embodiments. In particular, since the apparatus, the device, and the storage medium embodiments are basically similar to the method embodiments, the description of the apparatus, the device, and the storage medium embodiments is relatively simple. For related description, reference may be made to a corresponding part of the description of the method embodiments.

It would be understood by those skilled in the art that all or a part of the steps carried by the method in the above-described embodiments may be completed by hardware, or may be completed by relevant hardware instructed by a program. The program may be stored in a computer readable storage medium. The storage medium may be a read-only memory (ROM), a magnetic disk, an optical disk, or the like.

The above are only some embodiments of the present disclosure, and are not intended to limit the present disclosure. Any modification, equivalent replacement, improvement, etc. made within the spirit and principle of the present disclosure shall be included in the protection scope of the present disclosure.

What is claimed is:

1. A video image processing method, performed by a processor in a video image processing device, the method comprising:

obtaining a first target-frame video image, the first target-frame video image being one of to-be-processed multi-frame video images;

performing target detection on the first target-frame video image to determine at least one target object in the first target-frame video image;

determining at least one first to-be-processed target object from the at least one target object based on a predetermined classification rule for a to-be-processed target object; and replacing, in the first target-frame video image, the at least one first to-be-processed target object with a predetermined target visual substitute to obtain a second target-frame video image for remote or real-time transmission, wherein data volume of the predetermined target visual substitute is smaller than date volume of the at least one first to-be-processed target object;

remotely transmitting or transmitting in real-time the second target-frame video image for use in vehicle path planning or assisted driving, wherein said performing the target detection on the first target-frame video image to determine the at least one target object in the first target-frame video image comprises:

inputting the first target-frame video image into a target detection model for target detection, to obtain a first target detection result, the first target detection result comprising the at least one target object in the first target-frame video image;

wherein the first target detection result further comprises type information and first position information of each of the at least one target object; and said determining the at least one first to-be-processed target object from the at least one target object based on the predetermined classification rule for the to-be-processed target object comprises:

determining a first influence factor corresponding to each of the at least one target object based on the first position information and the type information of each of the at least one target object, wherein the first influence factor characterizes the degree to which the type information and the first position information of each of the at least one target object affect a driving path of a current vehicle; and determining, from the at least one target object, a target object corresponding to a first influence factor that satisfies a first predetermined condition as the at least one first to-be-processed target object, wherein the first predetermined condition comprises the first influence factor being irrelevant or weakly correlated, and the at least one first to-be-processed target object is irrelevant or weakly correlated to the driving path of the current vehicle.

2. The method according to claim 1, wherein:

the first target detection result further comprises first physical attribute information of the at least one first to-be-processed target object; and said replacing, in the first target-frame video image, the at least one first to-be-processed target object with the predetermined target visual substitute to obtain the second target-frame video image comprises:

performing, in the first target-frame video image, semantic segmentation on the at least one first to-be-processed target object based on the first position information of the at least one first to-be-processed target object, to obtain a segmentation region corresponding to the at least one first to-be-processed target object;

determining the predetermined target visual substitute corresponding to the at least one first to-be-processed target object based on the type information and the first physical attribute information of the at least one first to-be-processed target object;

replacing, in the corresponding segmentation region, the at least one first to-be-processed target object with the corresponding predetermined target visual substitute to obtain a replaced first target-frame video image; and smoothing, in the replaced first target-frame video image, an edge contour of the corresponding segmentation region to obtain the second target-frame video image.

3. The method according to claim 1, wherein:

when the at least one first to-be-processed target object comprises a plurality of first to-be-processed target objects, the first target detection result further comprises first physical attribute information of the plurality of first to-be-processed target objects; and said replacing, in the corresponding segmentation region, the at least one first to-be-processed target object with the corresponding predetermined target visual substitute to obtain the second target-frame video image comprises:

performing, in the first target-frame video image, instance segmentation on the plurality of first to-be-processed target objects based on the first position information of the plurality of first to-be-processed target objects, to obtain a plurality of segmentation regions corresponding to the plurality of first to-be-processed target objects;

determining, based on the type information and the first physical attribute information of the plurality of first to-be-processed target objects, a plurality of predetermined target visual substitutes corresponding to the plurality of first to-be-processed target objects, respectively;

replacing, in the corresponding plurality of segmentation regions, the plurality of first to-be-processed target objects with the corresponding plurality of predetermined target visual substitutes respectively, to obtain a replaced first target-frame video image; and smoothing, in the replaced first target-frame video image, edge contours of the corresponding plurality of segmentation regions, to obtain the second target-frame video image.

4. The method according to claim 1, wherein when the first predetermined condition comprises a second predetermined condition, the method further comprises, subsequent to said determining, from the at least one target object, the target object corresponding to the first influence factor that satisfies the first predetermined condition as the at least one first to-be-processed target object:

determining, from the at least one first to-be-processed target object, a first to-be-processed target object corresponding to a first influence factor that satisfies the second predetermined condition as a second to-be-processed target object, the method further comprises, subsequent to said replacing, in the first target-frame video image, the at least one first to-be-processed target object with the predetermined target visual substitute to obtain the second target-frame video image:

obtaining a next-frame video image of the first target-frame video image;

inputting the next-frame video image into the target detection model for the target detection, to obtain a second target detection result, wherein when the second target detection result comprises the second to-be-processed target object, the second target detection result further comprises second position information of the second to-be-processed target object;

determining a second influence factor of the second to-be-processed target object based on the type information and the second position information of the second to-be-processed target object;

determining whether the second influence factor satisfies the first predetermined condition; and replacing, in response to determining that the second influence factor does not satisfy the first predetermined condition, a predetermined target visual substitute corresponding to the second to-be-processed target object with the second to-be-processed target object.

5. A video image processing device, comprising:

a processor; and a memory having at least one instruction or program stored thereon, wherein the at least one instruction or program is loaded and executed by the processor to implement operations comprising:

obtaining a first target-frame video image, the first target-frame video image being one of to-be-processed multi-frame video images;

performing target detection on the first target-frame video image to determine at least one target object in the first target-frame video image;

determining at least one first to-be-processed target object from the at least one target object based on a predetermined classification rule for a to-be-processed target object; and replacing, in the first target-frame video image, the at least one first to-be-processed target object with a predetermined target visual substitute to obtain a second target-frame video image for remote or real-time transmission, wherein data volume of the predetermined target visual substitute is smaller than date volume of the at least one first to-be-processed target object;

remotely transmitting or transmitting in real-time the second target-frame video image for use in vehicle path planning or assisted driving, wherein said performing the target detection on the first target-frame video image to determine the at least one target object in the first target-frame video image comprises:

inputting the first target-frame video image into a target detection model for target detection, to obtain a first target detection result, the first target detection result comprising the at least one target object in the first target-frame video image;

wherein the first target detection result further comprises type information and first position information of each of the at least one target object; and said determining the at least one first to-be-processed target object from the at least one target object based on the predetermined classification rule for the to-be-processed target object comprises:

determining a first influence factor corresponding to each of the at least one target object based on the first position information and the type information of each of the at least one target object, wherein the first influence factor characterizes the degree to which the type information and the first position information of each of the at least one target object affect a driving path of a current vehicle; and determining, from the at least one target object, a target object corresponding to a first influence factor that satisfies a first predetermined condition as the at least one first to-be-processed target object, wherein the first predetermined condition comprises the first influence factor being irrelevant or weakly correlated, and the at least one first to-be-processed target object is irrelevant or weakly correlated to the driving path of the current vehicle.

6. The device according to claim 3, wherein:

the first target detection result further comprises first physical attribute information of the at least one first to-be-processed target object; and said replacing, in the first target-frame video image, the at least one first to-be-processed target object with the predetermined target visual substitute to obtain the second target-frame video image comprises:

performing, in the first target-frame video image, semantic segmentation on the at least one first to-be-processed target object based on the first position information of the at least one first to-be-processed target object, to obtain a segmentation region corresponding to the at least one first to-be-processed target object;

determining the predetermined target visual substitute corresponding to the at least one first to-be-processed target object based on the type information and the first physical attribute information of the at least one first to-be-processed target object;

replacing, in the corresponding segmentation region, the at least one first to-be-processed target object with the corresponding predetermined target visual substitute to obtain a replaced first target-frame video image; and smoothing, in the replaced first target-frame video image, an edge contour of the corresponding segmentation region to obtain the second target-frame video image.

7. The device according to claim 5, wherein:

when the at least one first to-be-processed target object comprises a plurality of first to-be-processed target objects, the first target detection result further comprises first physical attribute information of the plurality of first to-be-processed target objects; and said replacing, in the corresponding segmentation region, the at least one first to-be-processed target object with the corresponding predetermined target visual substitute to obtain the second target-frame video image comprises:

performing, in the first target-frame video image, instance segmentation on the plurality of first to-be-processed target objects based on the first position information of the plurality of first to-be-processed target objects, to obtain a plurality of segmentation regions corresponding to the plurality of first to-be-processed target objects;

determining, based on the type information and the first physical attribute information of the plurality of first to-be-processed target objects, a plurality of predetermined target visual substitutes corresponding to the plurality of first to-be-processed target objects, respectively;

replacing, in the corresponding plurality of segmentation regions, the plurality of first to-be-processed target objects with the corresponding plurality of predetermined target visual substitutes respectively, to obtain a replaced first target-frame video image; and smoothing, in the replaced first target-frame video image, edge contours of the corresponding plurality of segmentation regions, to obtain the second target-frame video image.

8. The device according to claim 5, wherein when the first predetermined condition comprises a second predetermined condition, the operations further comprise, subsequent to said determining, from the at least one target object, the target object corresponding to the first influence factor that satisfies the first predetermined condition as the at least one first to-be-processed target object:

determining, from the at least one first to-be-processed target object, a first to-be-processed target object corresponding to a first influence factor that satisfies the second predetermined condition as a second to-be-processed target object, the operations further comprise, subsequent to said replacing, in the first target-frame video image, the at least one first to-be-processed target object with the predetermined target visual substitute to obtain the second target-frame video image:

obtaining a next-frame video image of the first target-frame video image;

inputting the next-frame video image into the target detection model for the target detection, to obtain a second target detection result, wherein when the second target detection result comprises the second to-be-processed target object, the second target detection result further comprises second position information of the second to-be-processed target object;

determining a second influence factor of the second to-be-processed target object based on the type information and the second position information of the second to-be-processed target object;

determining whether the second influence factor satisfies the first predetermined condition; and replacing, in response to determining that the second influence factor does not satisfy the first predetermined condition, a predetermined target visual substitute corresponding to the second to-be-processed target object with the second to-be-processed target object.

9. A non-transitory computer-readable storage medium, having at least one instruction or program stored therein, wherein the at least one instruction or program is loaded and executed by a processor to implement operations comprising:

obtaining a first target-frame video image, the first target-frame video image being one of to-be-processed multi-frame video images;

performing target detection on the first target-frame video image to determine at least one target object in the first target-frame video image;

determining at least one first to-be-processed target object from the at least one target object based on a predetermined classification rule for a to-be-processed target object; and replacing, in the first target-frame video image, the at least one first to-be-processed target object with a predetermined target visual substitute to obtain a second target-frame video image for remote or real-time transmission, wherein data volume of the predetermined target visual substitute is smaller than date volume of the at least one first to-be-processed target object;

remotely transmitting or transmitting in real-time the second target-frame video image for use in vehicle path planning or assisted driving, wherein said performing the target detection on the first target-frame video image to determine the at least one target object in the first target-frame video image comprises:

inputting the first target-frame video image into a target detection model for target detection, to obtain a first target detection result, the first target detection result comprising the at least one target object in the first target-frame video image;

wherein the first target detection result further comprises type information and first position information of each of the at least one target object; and said determining the at least one first to-be-processed target object from the at least one target object based on the predetermined classification rule for the to-be-processed target object comprises:

determining a first influence factor corresponding to each of the at least one target object based on the first position information and the type information of each of the at least one target object, wherein the first influence factor characterizes the degree to which the type information and the first position information of each of the at least one target object affect a driving path of a current vehicle; and determining, from the at least one target object, a target object corresponding to a first influence factor that satisfies a first predetermined condition as the at least one first to-be-processed target object, wherein the first predetermined condition comprises the first influence factor being irrelevant or weakly correlated, and the at least one first to-be-processed target object is irrelevant or weakly correlated to the driving path of the current vehicle.

10. The non-transitory computer-readable storage medium according to claim 9, wherein:

the first target detection result further comprises first physical attribute information of the at least one first to-be-processed target object; and said replacing, in the first target-frame video image, the at least one first to-be-processed target object with the predetermined target visual substitute to obtain the second target-frame video image comprises:

performing, in the first target-frame video image, semantic segmentation on the at least one first to-be-processed target object based on the first position information of the at least one first to-be-processed target object, to obtain a segmentation region corresponding to the at least one first to-be-processed target object;

determining the predetermined target visual substitute corresponding to the at least one first to-be-processed target object based on the type information and the first physical attribute information of the at least one first to-be-processed target object;

replacing, in the corresponding segmentation region, the at least one first to-be-processed target object with the corresponding predetermined target visual substitute to obtain a replaced first target-frame video image; and smoothing, in the replaced first target-frame video image, an edge contour of the corresponding segmentation region to obtain the second target-frame video image.

11. The non-transitory computer-readable storage medium according to claim 9, wherein:

when the at least one first to-be-processed target object comprises a plurality of first to-be-processed target objects, the first target detection result further comprises first physical attribute information of the plurality of first to-be-processed target objects; and said replacing, in the corresponding segmentation region, the at least one first to-be-processed target object with the corresponding predetermined target visual substitute to obtain the second target-frame video image comprises:

performing, in the first target-frame video image, instance segmentation on the plurality of first to-be-processed target objects based on the first position information of the plurality of first to-be-processed target objects, to obtain a plurality of segmentation regions corresponding to the plurality of first to-be-processed target objects;

determining, based on the type information and the first physical attribute information of the plurality of first to-be-processed target objects, a plurality of predetermined target visual substitutes corresponding to the plurality of first to-be-processed target objects, respectively;

replacing, in the corresponding plurality of segmentation regions, the plurality of first to-be-processed target objects with the corresponding plurality of predetermined target visual substitutes respectively, to obtain a replaced first target-frame video image; and smoothing, in the replaced first target-frame video image, edge contours of the corresponding plurality of segmentation regions, to obtain the second target-frame video image.

12. The non-transitory computer-readable storage medium according to claim 9, wherein when the first predetermined condition comprises a second predetermined condition, the operations further comprise, subsequent to said determining, from the at least one target object, the target object corresponding to the first influence factor that satisfies the first predetermined condition as the at least one first to-be-processed target object:

determining, from the at least one first to-be-processed target object, a first to-be-processed target object corresponding to a first influence factor that satisfies the second predetermined condition as a second to-be-processed target object, the operations further comprise, subsequent to said replacing, in the first target-frame video image, the at least one first to-be-processed target object with the predetermined target visual substitute to obtain the second target-frame video image:

obtaining a next-frame video image of the first target-frame video image;

inputting the next-frame video image into the target detection model for the target detection, to obtain a second target detection result, wherein when the second target detection result comprises the second to-beprocessed target object, the second target detection result further comprises second position information of the second to-be-processed target object;

determining a second influence factor of the second to-be-processed target object based on the type information and the second position information of the second to-be-processed target object;

determining whether the second influence factor satisfies the first predetermined condition; and replacing, in response to determining that the second influence factor does not satisfy the first predetermined condition, a predetermined target visual substitute corresponding to the second to-be-processed target object with the second to-be-processed target object.

* * * * *